Dec. 14, 1937. C. A. BROCK 2,102,353
VACUUM CLEANER
Filed Jan. 8, 1937
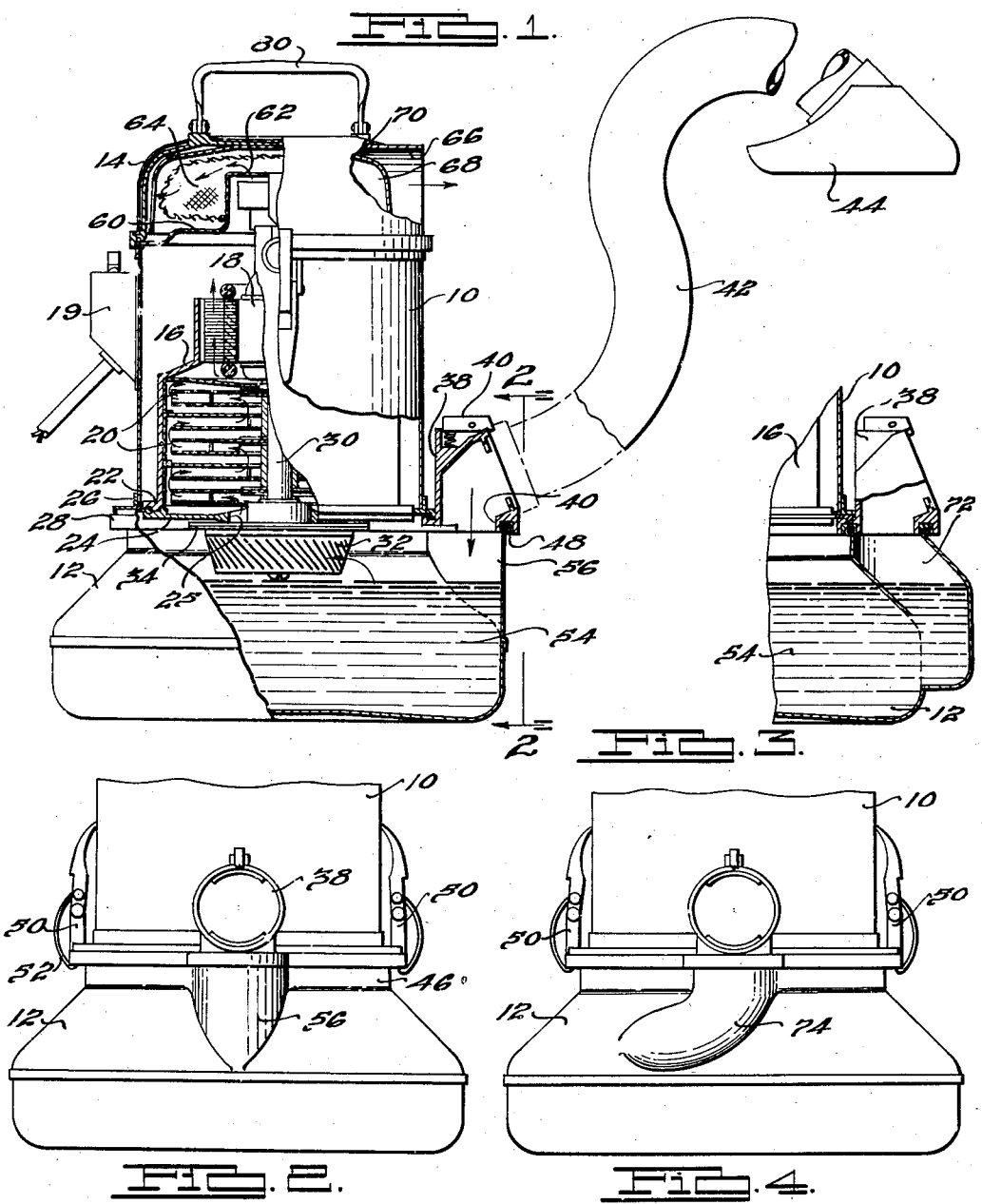
Inventor
Clarence A. Brock.
By Harness, Dickey, Pierce & Hann.
Attorneys.

Patented Dec. 14, 1937

2,102,353

UNITED STATES PATENT OFFICE 2,102,353

VACUUM CLEANER

Clarence A. Brock, Detroit, Mich., assignor to Rexair Corporation, Detroit, Mich., a corporation of Michigan Application January 8, 1937, Serial No. 119,578

7 Claims. (Cl. 183—24)

The present invention relates generally to a method and apparatus for treating air and particularly relates to a portable vacuum cleaner designed for treating air by impinging the air against the surface of or otherwise bringing it into contact with a liquid bath to treat the air according to the type of liquid used as the bath.

While the specific embodiment of the invention herein shown and described is illustrated as a part of a vacuum cleaning system, according to the broader aspects of the present invention, the structure will find practical utility in many other fields such as air conditioning, disinfecting, and medical treatment.

Primary objects of the present invention are to provide a structure having a separator and a bath of liquid associated therewith through which the air within a room is drawn and redischarged into the room and which, in passing through the structure, is so treated as to remove the solids and humidify or otherwise treat the air; to provide a structure whereby the air drawn from the room is passed into contact with a water bath and thereby purified for re-discharge back into the room; to provide a structure containing a bath of germicidal solution through which the air is passed to destroy any germs carried therein; to provide an apparatus containing a liquid, the liquid being of such a nature as to act as an avenue by which germicides may be handled or be dissolved therein; to provide a structure in which dust or other foreign material is separated from the air passed therethrough and may be conveniently disposed of as sewage; and to provide a structure which may be used for medicinal treatments.

Other objects of the invention are to provide a structure in which dust and germ-laden air is caused to impinge against the surface of a liquid to thereby remove the dust and germs from the air; and to provide a structure in which the dust and other foreign materials are removed from the air and fixed in a liquid for convenient discharge.

Other objects of the invention will become apparent from the following specification, the drawing relating thereto and from the claims hereinafter set forth.

In the drawing, in which like numerals are used to designate like parts in the several views throughout.

Figure 1 is a side elevational view with parts broken away showing parts in section of an apparatus embodying features of the present invention;

Fig. 2 is a partial side elevational view taken substantially along the line 2—2 of Fig. 1;

Fig. 3 is a partial vertical cross-sectional view of a modified form of structure;

Fig. 4 is a view similar to Fig. 2 illustrating a modified form of structure;

Fig. 5 is a partial elevational view of a modified form of separator; and

Fig. 6 is an enlarged cross-sectional view taken substantially along the line 6—6 of Fig. 5.

According to the present invention, by using a liquid bath in its association with a portable vacuum cleaner apparatus the air is not only completely cleaned but may also be treated to obtain various results. When water is the liquid used in the apparatus the air passed therethrough is humidfied and the apparatus provides a compact and improved portable air conditioning unit. The unit is particularly useful in conditioning the air within a relatively small enclosed space such as a room or the like; and is further particularly useful when used in a room for the treatment of hay fever and sinus disturbances. Further by including a precipitant or a germicidal material or both in solution in the liquid any germ laden solids carried by the air are removed by their contact with the liquid, and the purified air is re-discharged into the room. Furthermore, when the vacuum cleaner is actually being used for cleaning purposes, any germs that are picked up thereby from the floor or carpets are retained in and may be destroyed by the bath. Accordingly, the invention is particularly advantageous in connection with the cleaning of rooms in which children play.

It has also been found that by including tincture of benzoin, eucalyptus oil, or other medicinal compounds commonly employed for treatment of infections or diseases of the respiratory organs, in solution in the liquid that the unit may then be used in a sick room, and the air re-discharged into the room after passing through the apparatus carries therewith the benzoin, eucalyptus oil, or other compound as a vapor with the recognized beneficial results to the patient. When employed for this purpose the cleaner will ordinarily not be simultaneously employed for cleaning the floors as well, but may be, in which case one operation will be incidental to the other, as will be apparent.

As the present invention contemplates a compact unit which is portable, it is evident that the structure is particularly adapted for the uses mentioned above, as the unit may be conveniently placed in the particular location where the air treatment is most desirable. For example it can be seen that when used for medical treatment the unit may be placed as near to the patient as desired; and when used for disinfecting, the unit may be placed in a room or closet in a position to obtain the best results.

According to one embodiment of the present invention the air is drawn into the unit immediately above the normal surface of the liquid and is caused to impinge against the surface of the liquid before reaching the separator. Additionally the liquid may be agitated in a more or less violent manner to enhance the washing effect on the air. As a modified embodiment of the present invention, the air may be drawn into the unit and discharged therein at a point below the normal surface of the liquid, resulting in absolute washing of the air. The air passed through the liquid is cleaned and humidified and may be re-discharged into the room with or without passing it through a separator. The centrifugal separator is desirable even when the unit is used for air conditioning only, as it will act to separate out unvaporized particles of water.

In using a portable vacuum cleaner having an air separator associated therewith in which air containing dust or other foreign material is drawn directly through the separator, it has been found that, while satisfactory results are obtained with such a structure, certain small proportions of impalpable dust passes through the separator and is not removed from the air. According to the present invention, a structure is provided having a pan member adjacent the lower end thereof into which a centrifugal separator extends and within which a bath of liquid is provided. Rotation of the centrifugal separator causes swirling of the air within the receptacle above the surface of the bath, and the friction of the air against the surface of the bath in turn causes rotation or swirling of the bath or liquid within the receptacle. The air entering the receptacle is caused to impinge against the surface of the bath thereby separating the dust or other foreign material from the air. It has been found that with the use of the liquid bath with the mechanical separator the dust and other foreign material contained within the air are completely removed, and that the air may then be re-discharged into the room in a completely cleaned condition.

In prior vacuum cleaner structures the disposal of the refuse removed from the air has been a cumbersome and unsatisfactory operation, as it has been necessary to dispose the dust on a paper or in another collecting receptacle in an unsanitary manner. According to the present invention a convenient and safe disposal of the refuse is accomplished as the dust and other foreign material is fixed and collected in the liquid bath; and simply by removing a cover over an opening associated with the bath, the liquid carrying with it the dust and other foreign material may be poured out and disposed of as sewage. If this liquid has been treated by a suitable germicidal agent, as previously suggested, while it will still be filthy it will be inocuous.

In order to obtain a better and a more complete understanding of the objects and advantages of the present invention, reference may be had to applicant's co-pending application for Letters Patent of the United States Serial No. 54,966, filed December 18, 1935 in which a dust separator for vacuum cleaner systems is disclosed having many features in common with the present invention, and also to applicant's co-pending application for Letters Patent of the United States for improvements in Vacuum cleaner, filed March 15, 1937 and serially numbered 130,920 which covers the actual construction of the vacuum cleaner shown herein.

Referring to the drawing for a better understanding of the invention and referring particularly to Figs. 1 and 2, one specific embodiment of the invention is illustrated comprising a casing or housing having an intermediate portion or section 10, a lower portion 12 in the form of a pan member, and a top cover portion 14. The housing or casing is preferably constructed of sheet metal or other suitable construction and is generally circular in shape.

A blower housing 16 is mounted within the intermediate section 10 and has mounted therein a suitable electric motor 18, connected to and operated through a conventional switch structure 19, which serves to drive a plurality of centrifugal fans 20. The fans 20 provide a multiple stage blower construction tending to draw air axially upwardly through the housing 16 as indicated by the arrows in Fig. 1. The blower housing is provided at its lower end with an annular flange 22 which has a groove in the axial face thereof. A separator plate 24 has a grooved face adapted to mate with the grooved flange 22 and is secured thereto by means of suitable annularly spaced screws, or the like. An annular packing strip 26 having a beaded edge and preferably formed of rubber or suitable resilient composition is disposed with its beaded edge clamped between the separator plate 24 and the annular flange 22 by means of the screws which secure the separator member to the flange. The other, or outer, edge of the annular packing strip is secured to the lower edge of the intermediate housing section 10 between the lower edge of the section 10 and an annular flange member 28 which is secured to the section 10. The separator member 24 is provided with spaced openings 25 therethrough substantially centrally thereof for communicating the interior of the blower housing with the space within the receptacle 12.

The construction of the blower, its arrangement within its housing 16, and the construction for the housing mounting relative to the casing is substantially the same here as disclosed in applicant's co-pending application above referred to; and the separator element per se in the present application is substantially the same as that disclosed in applicant's co-pending application first referred to, except that in the present application the centrifugal separator is disposed at the lower end of the housing, rather than the upper end as disclosed in the co-pending application referred to. Reference may be had to applicant's co-pending applications referred to for certain details of construction which form no part of the present invention disclosed and claimed.

Secured to the lower end of the blower shaft 30 for rotation therewith and spaced below the underside of the separator plate 24 and extending downwardly into the pan member 12 is a centrifugal dust separator element 32 adapted to be driven by the shaft 30. The element 32 may be formed in any conventional manner, and it has been found preferable to construct it from a single, integral sheet metal stamping to provide a frusto-conical structure having helically extending slots therethrough substantially throughout its entire peripheral surface. As disclosed in applicant's co-pending applications, above referred to, the slots in the peripheral surfaces of the dust separator element 32 are defined by helically disposed bars which have their exterior surfaces rounded and the forward or leading edges thereof extending radially inwardly a slightly greater distance than the trailing edges. By such a construction, as the dust separator element rotates the air entering the slots therein is required to follow a relatively tortuous path and due to the inertia of the dust particles it will be seen that they will necessarily impinge upon the rounded surface of the bars and be centrifugally driven away from the elements, thus preventing their entry into the interior thereof.

The dust separator element 32 is provided at its upper axial end with a radially extending flange 34 which is suitably secured to the shaft 30 of the motor for rotation therewith. When the motor 18 is in operation, air will be drawn inwardly through the slots in the separator element 32 by means of the centrifugal blower 20 and dust or other foreign material in such air will impinge upon the rounded surfaces of the bars and be centrifugally driven away.

Secured to one side of the intermediate section 10 is a fitting 38 providing an air inlet opening 40 into the chamber within the pan member 12. The fitting 38 is provided with a spring latch mechanism 40 for releasably securing thereto one end of a flexible conduit 42 which is adapted to be suitably connected to a nozzle member 44.

The pan member 12 has inwardly and upwardly sloping walls over a portion thereof and has an upwardly extending upper peripheral edge 46 which is removably received within the flange 28 of the intermediate section 10. A sealing strip 48 of resilient material, such as rubber, securely embraces the upper edge of the portion 46 and is received within the flange 28 for providing a sealed connection between the intermediate section 10 and the pan member 12. Releasable latching means 50, of suitable construction, are mounted on the intermediate section 10 and have spring portions 52 which releasably engage the pan member 12 to maintain it in its assembled position with the intermediate section 10.

According to the present invention the pan member 12 provides a receptacle for a bath of liquid 54 having its upper level initially extended near to or adjacent the lower extremity of the separator element 52 and which bath is intended as a normal operative part of the mechanism. The pan member 12 is provided with an upstanding outwardly pressed portion 56 adjacent one side thereof which extends upwardly into engagement with the fitting 38 for providing an air inlet conduit into the interior of the pan member 12.

As disclosed above the liquid within the container may be water, a germicidal solution, oil, or other suitable liquid, solution or mixture depending upon the purpose to which the structure is to be put.

A top cover member 60 is suitably secured to the top of the intermediate section 10 and is provided with a plurality of openings 62 therethrough for the egress of air from the housing section 10. A filter member 64 is mounted on the cover member 60 to insure the complete cleaning of the air passed through the cleaner.

The top cover 14 is provided with an outlet opening 66 adjacent one side thereof and is also provided with an annular flange adjacent the lower edge thereof which co-operates with the upper edge of the intermediate section 10 for providing a sealed connection between the cover 14 and the intermediate section 10 when the members are in their assembled positions. Means similar to those shown at 50 may be provided for removably securing the top 14 to the intermediate section 10. A substantially circular member 68 having openings 70 therethrough is mounted to the inner wall of the top member 14 in spaced relation thereto and in overlying relation to the filter 64 when the parts are in their assembled positions. The treated or cleaned air passes outwardly through the openings 70 and is discharged through the opening 66 back into the room or space within which the cleaning unit is being used.

In operation, rotation of the centrifugal separator element 32 causes a swirling of the air within the receptacle above the surface of the bath which in turn, due to friction, causes a swirling or rotation of the bath. This rotation of the bath may, or may not, create a spray or sheet of liquid about the periphery of the bath, depending upon the speed of rotation of the separator. Where such spray or sheet is created all of the air entering the pan 12 will be caused to pass through it, and will be more intimately treated thereby. The air being drawn into the pan member 12 by the blower 20 is caused to pass over the surface of the bath in contact therewith before entering the separator, and any foreign materials carried by the entering air are removed from the air and fixed by the liquid in its association with the centrifugal separator. Where the liquid is water, the air passing thereover in contact therewith is humidified; where the liquid is a germicidal solution any germs carried by the air are destroyed by the contact of the air with the liquid; and where the liquid contains medicinal compounds in solution, the air is thereby treated to carry therewith vaporized particles of the solution through the discharge opening into the room. The treated or cleaned air is caused to pass through the slots in the element 32 into the blower housing, through the openings 25 and upwardly therethrough, as indicated by the arrows, into the interior of the housing section 10 and out through the top of the cleaner.

In a modified structure as shown in Fig. 3 an element 72 is provided which co-operates with the outer surface of the pan member 12 and extends downwardly below the top surface of the liquid bath 54 exteriorly of the pan to provide an air inlet conduit. The member 72 communicates with the interior of the pan member through an opening in the pan below the surface of the liquid bath which necessitates the passage of air through the bath 54 before entering the free space within the pan member 12 within which the separator element 32 is located. The element 72 is preferably so located, as shown, as not to interfere with the swirling action of the liquid in the pan, and by this structure absolute washing of the air before being re-discharged back into the room is accomplished. In this structure, although the separator element 32 may be dispensed with, its use is desirable as it will act to separate out unvaporized particles of water from the air before the air passes through the blower and is re-discharged back into the room or space within which the unit is being used. Further, when the centrifugal separator is used with this structure, it need not be rotated at the high speeds necessary in the embodiment previously described as the air entering the separator is already completely free of any foreign materials.

In another modified structure shown in Fig. 4 an element 74 provides the air inlet conduit, corresponding to that shown at 56 in the embodiment illustrated in Figs. 1 and 2, and tangentially enters the chamber within the pan member 12. The air entering the pan member 12 through the inlet chamber provided by the member 74 thus assists the separator element 32 in causing swirling of the liquid bath within the receptacle 12 thereby causing separation of the foreign material carried by the air therefrom.

In the structure illustrated in Figs. 5 and 6 a modified form of separator element 32 is illustrated in which an elongated and downwardly extending projection 76 is provided on the lower face of the separator element 32, substantially centrally thereof, which projects slightly below the level of the liquid bath 54 and further assists, initially at least, in causing the agitation and swirling of the liquid desirable for the effective cleaning of the air entering the chamber formed by the receptacle 12.

From the above it is evident that the liquid contained within the receptacle 12 fixes the dust or other foreign material as it is passed therethrough and is held with the liquid in the receptacle. To dispose of the refuse collected within the receptacle 12 it is merely necessary to disengage the receptacle 12 from the intermediate portion 10 by releasing the catch members 50; and the refuse along with the liquid may be poured from the container 12 and disposed of as sewage.

A handle 80 may be suitably secured to the cover 14 along the top thereof so that the cleaning unit as a whole may be readily transported from one position to another by hand.

Formal changes may be made in the specific embodiments of the invention described without departing from the spirit and substance of the broad invention, the scope of which is commensurate with the appended claims.

What I claim is:

1. In a device of the class described, a portable vacuum cleaner housing having inlet and outlet openings therethrough and including a receptacle containing a bath of liquid, said inlet opening communicating with said receptacle, a blower within said housing, a centrifugal separator extending into said receptacle above said bath, and means for operating said blower and said separator for drawing air into said housing through said inlet opening, into contact with the liquid of said bath, through said separator, and for discharging the air through said outlet opening.

2. In a device of the class described, a portable vacuum cleaner housing having inlet and outlet openings therethrough and including a receptacle containing a bath of liquid, said inlet opening communicating with said receptacle above the normal surface of said bath of liquid, a blower within said housing, a centrifugal separator extending into said receptacle above said bath, and means for operating said blower and said separator for drawing air into said housing through said inlet opening, into contact with the liquid of said bath, through said separator, and for discharging the air through said outlet opening.

3. In a device of the class described, a portable vacuum cleaner housing having inlet and outlet openings therethrough and including a removable receptacle containing a bath of liquid, said inlet opening communicating with said receptacle, a blower mounted within said housing for rotation about a substantially vertical shaft, a centrifugal separator mounted on the lower end of said shaft and extending into said receptacle above the normal surface of said bath, and means for operating said blower and said separator for drawing air into said housing through said inlet opening, into contact with the liquid of said bath, through said separator, and for discharging the air through said outlet opening.

4. In a device of the class described, a portable vacuum cleaner housing having inlet and outlet openings therethrough and including a removable receptacle containing a bath of liquid, means for forming an air inlet conduit communicating with said inlet opening and extending downwardly below the normal surface of said bath, a blower within said housing, a centrifugal separator extending into said receptacle to a position above the normal surface of said bath, and means for operating said blower and said separator for drawing air into said housing through said conduit, through said bath, through said separator, and for discharging air through said outlet opening.

5. In a device of the class described, a portable vacuum cleaner housing having inlet and outlet openings therethrough and including a removable receptacle containing a bath of liquid, means forming an inlet conduit communicating with said inlet opening and directing the air entering said receptacle in a direction tangential to the normal surface of said bath, a blower within said housing, a centrifugal separator extending into said receptacle above the normal surface of said bath, and means for operating said blower and said separator for drawing air into said housing through said inlet opening, into contact with the surface of said liquid bath, through said separator, and for discharging the air through said outlet opening.

6. In a device of the class described, a portable vacuum cleaner housing having inlet and outlet openings therethrough and including a removable receptacle containing a bath of liquid, said receptacle having upwardly and inwardly sloping wall portions, said inlet opening communicating with said receptacle above the normal level of said bath, a blower mounted for rotation about a substantially vertical shaft, a centrifugal separator mounted for rotation with said shaft adjacent the lower end thereof and extending into said receptacle to a position above the normal surface of said bath, and means for operating said blower and said separator for drawing air into said housing through said inlet opening, into contact with said surface of said bath, through said separator, and for discharging the air through said outlet opening.

7. In a device of the class described, a portable vacuum cleaner housing having inlet and outlet openings therethrough and including a removable receptacle containing a bath of liquid, said inlet opening communicating with said receptacle above the normal level of said bath, a blower mounted for rotation about a substantially vertical shaft within said housing, a centrifugal separator mounted for rotation with said shaft adjacent the lower end thereof and extending into said receptacle to a position above the normal surface of said bath, an abutment mounted on the lower face of said separator substantially centrally thereof and extending downwardly into said bath below the normal level thereof, and means for operating said blower and said separator for drawing air into said housing through said inlet opening, into contact with the liquid of said bath, through said separator, and for discharging the air through said outlet opening.

CLARENCE A. BROCK.